(12) United States Patent
Spickermann

(10) Patent No.: US 6,522,697 B1
(45) Date of Patent: Feb. 18, 2003

(54) USE OF HIGHER ORDER MODULATION TECHNIQUES TO TRANSMIT LARGE AGGREGATE DATA RATES ON AN OPTICAL LINK WITH RELATIVELY LOW SPEED ELECTRONICS

(75) Inventor: Ralph Spickermann, Redwood City, CA (US)

(73) Assignee: Lockhead Martin Corporation, Bethesda, MD (US)

(*) Notice: Subject to any disclaimer, the term of this patent is extended or adjusted under 35 U.S.C. 154(b) by 0 days.

(21) Appl. No.: 09/248,420

(22) Filed: Feb. 11, 1999

(51) Int. Cl.[7] .............................. H03K 9/06; H04J 14/02
(52) U.S. Cl. ........................................ 375/271; 359/126
(58) Field of Search .................................. 375/271, 285, 375/281, 296; 370/295; 359/126, 124, 123, 115, 34, 109, 286, 287; 455/102, 112

(56) References Cited

U.S. PATENT DOCUMENTS

| | | | | |
|---|---|---|---|---|
| 5,222,103 A | * | 6/1993 | Gross | 329/304 |
| 5,477,366 A | * | 12/1995 | Moss et al. | 359/158 |
| 5,678,198 A | * | 10/1997 | Lemson | 359/194 |
| 6,271,953 B1 | * | 8/2001 | Dishman et al. | 359/130 |

* cited by examiner

*Primary Examiner*—Chi Pham
*Assistant Examiner*—Khai Tran
(74) *Attorney, Agent, or Firm*—Kenneth W. Float

(57) ABSTRACT

Systems and methods that increase the maximum data rate capacity per optical carrier on an optical link. The present invention intensity modulates an optical carrier with one or more (microwave) carriers that have been higher order modulated (M-ary ASK, PSK, QAM, and the like) using bandwidth efficient modulation. Consequently, as the number of bits/symbol is increased, the bit rate increases without an increase in occupied bandwidth. Thus, 2 bit/Hz or more of optical channel bandwidth may be transmitted.

13 Claims, 3 Drawing Sheets

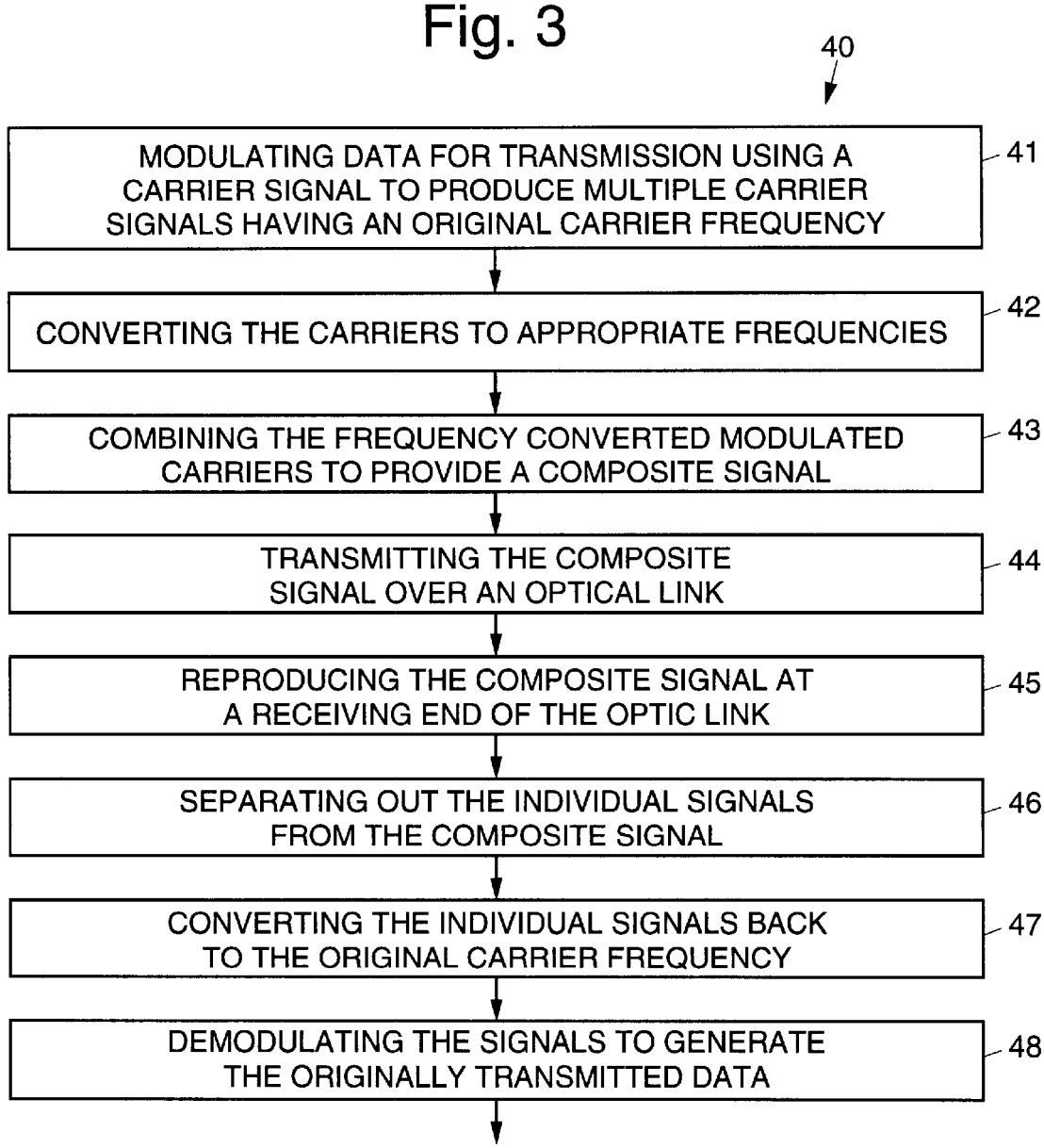

USE OF HIGHER ORDER MODULATION TECHNIQUES TO TRANSMIT LARGE AGGREGATE DATA RATES ON AN OPTICAL LINK WITH RELATIVELY LOW SPEED ELECTRONICS

BACKGROUND

The present invention relates generally to optical communications systems and methods, and more particularly, to the use of bandwidth efficient modulation techniques to transmit information over an optical link.

Previous solutions for transmitting the maximum amount of information on one optical carrier in an optical link involved increasing the speed of simple on-off-keying (OOK) up to the limitations of available electronics technology. For on-off-keying, the bit rate is directly proportional to the electrical bandwidth of the electronics (1 bit/Hz). For example, 40 Gbit on-off-keying requires 40 GHz electronics at least. Not only are such electronics difficult to manufacture, they are expensive, thermally sensitive, and subject to exacting design techniques in every way. At about 40 GHz, some fundamental physical constraints become a problem; the unity gain frequencies of currently available IC foundry transistors are not adequate. Extremely advanced techniques that are currently barely achievable in the laboratory are required for greater than 30 Gbit on-off-keying. These devices are thermally unstable.

Various patents have been issued relating to transmission of data via optical communication systems that were uncovered in a search relating to the present invention. These patents disclose apparatus and methods relating to optical modulators, intermodulation products, amplifiers, receivers, heterodyne communication frequency multiplexed carriers, linearizers, signal sources, frequency division multiplexing, intensity modulation, mixers, spread spectrum CDMA systems, harmonic interference, optical carrier filtering and polarization schemes. However, none of the patents uncovered in the search disclose the use of bandwidth efficient modulation techniques to transmit information over an optical link.

Therefore, it would be advantageous to have systems and methods that improve the maximum data transmission capacity on one optical carrier in an optical link.

SUMMARY OF THE INVENTION

The present invention increases the maximum data rate capacity per optical carrier on an optical link. The present invention intensity modulates an optical carrier with one or more (microwave) carriers that have been higher order modulated (M-ary ASK, PSK, QAM, etc.). These higher order modulation formats are known as bandwidth efficient modulation (BEM) methods, because they encode more than one bit per encoded symbol, but the electrical bandwidth used is proportional to the symbol rate. As a result, as the number of bits/symbol is increased, the bit rate increases without an increase in occupied bandwidth. Thus, 2 bit/Hz or more of optical channel bandwidth may be transmitted. In contrast, on-off-keying is limited to 1 bit/Hz.

An exemplary system comprises a plurality of modulators that modulate a plurality of data streams. The first modulator may be an amplitude shift keyed (ASK) modulator, using either on-off-keying or multiple amplitude steps. The remaining modulators encode their data streams on (microwave) carriers using bandwidth efficient modulation. A plurality of frequency converters are then used to convert the carriers to a plurality of frequencies that are respectively spaced such that the filters at the receiver may cleanly separate their associated data spectral lobes. A combiner is used to combine the signals into a composite (microwave) spectrum that is transmitted over the optical link. At the receiving end of the link, a splitter and a plurality of bandpass filters are used to separate the recovered spectrum into its individual data streams. A plurality of frequency converters and a plurality of demodulators are used to extract the originally transmitted data from each data stream.

As described above, each of the bandwidth-efficient-modulated carriers can transmit multiple bits per Hz of optical link bandwidth. Although there is some wasted band in separating the individual BEM spectra of the composite spectrum, the aggregate rate for the link is higher than 1 bit/Hz. In addition, the individual bandwidth efficient modulated signals use digital switching electronics proportional to their relatively slow symbol rate, so the maximum aggregate link data rate is not limited by the transistor technology speed. Rather, the aggregate link rate is limited by the optical channel electrical bandwidth, which today may be 40 GHz. Thus, because the present invention achieves over 1 bit/Hz spectral efficiency, over 40 Gbit may be transmitted on one optical carrier.

An exemplary method comprises the following steps. A plurality of data streams are encoded for transmission onto multiple copies of a microwave carrier to produce multiple signals having a first carrier frequency. The carriers are converted to appropriate frequencies that are spaced so that their associated data spectral lobes may be separated. The frequency converted modulated carriers are then combined to provide a composite signal. The composite signal is transmitted over the optical link. The composite signal is reproduced at a receiving end of the optical link. The individual data streams are separated out from the composite signal, and are converted back to the original carrier frequency. The data streams are then demodulated to generate the originally transmitted data.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2b illustrates an exemplary composite microwave data spectrum in accordance with the principles of the present invention utilizing the same bandwidth as 2a; and FIG. 3 is a flow chart that illustrates an exemplary data communication method in accordance with the principles of the present invention.

DETAILED DESCRIPTION

Figure 1:
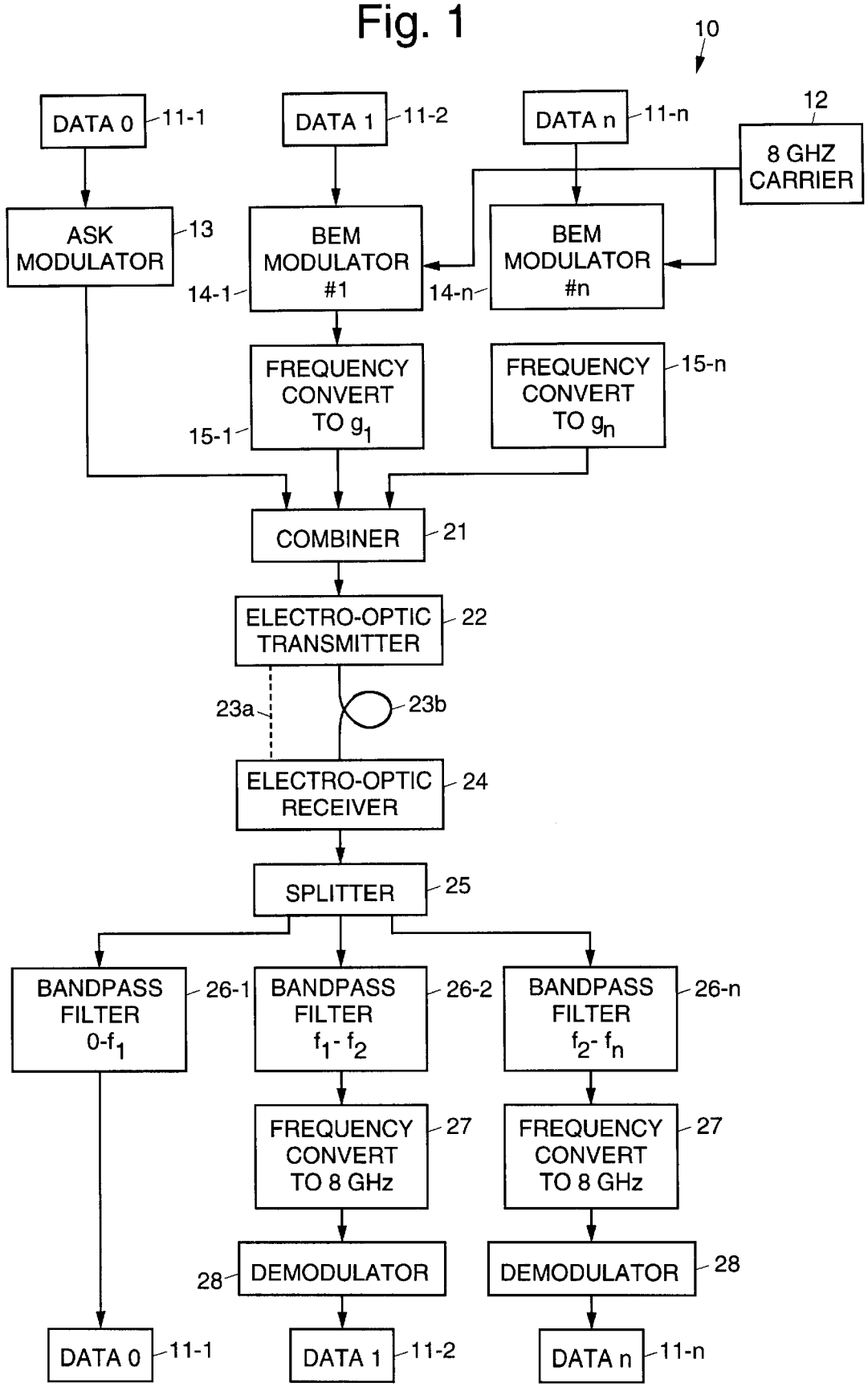
FIG. 1 illustrates an exemplary system in accordance with the principles of the present invention that increases the information carrying capacity of an optical communication link.

Referring to the drawing figures, FIG. 1 illustrates an exemplary system 10 in accordance with the principles of the present invention that increases the information carrying capacity of an optical communication link 20 comprising an electro-optic transmitter 22 and an electro-optic receiver 24 interconnected using either a free space beam 23a or an optical fiber 23b. The optical communication link may be one optical channel of a wavelength division multiplexed link.

A plurality of data streams (DATA 0, DATA 1, ..., DATA n) 11 (11-1, 11-2, 11-n) are modulated by a plurality of modulators 13, 14-1, ..., 14-n. A first modulator 13 is an amplitude shift keyed (ASK) modulator, using either on-off-keying (OOK) or multiple amplitude steps.

The remaining modulators 14-1, ..., 14-n are BEM modulators 14 that encode their data streams on a carrier 12, such as an 8 GHz carrier 12, for example, by means of BEM modulation in accordance with the principles of the present invention. Any number of M-ary amplitude and phase shift keying methods may be used, as desired, to produce the bandwidth efficient modulation.

Figure 2A:
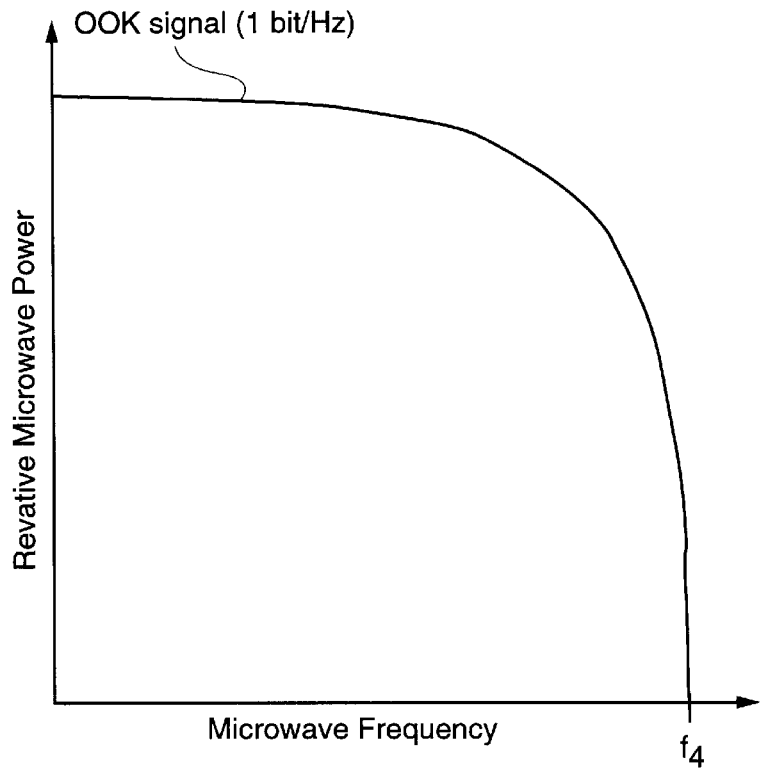
FIG. 2a illustrates an exemplary OOK microwave spectrum.
Figure 2B:
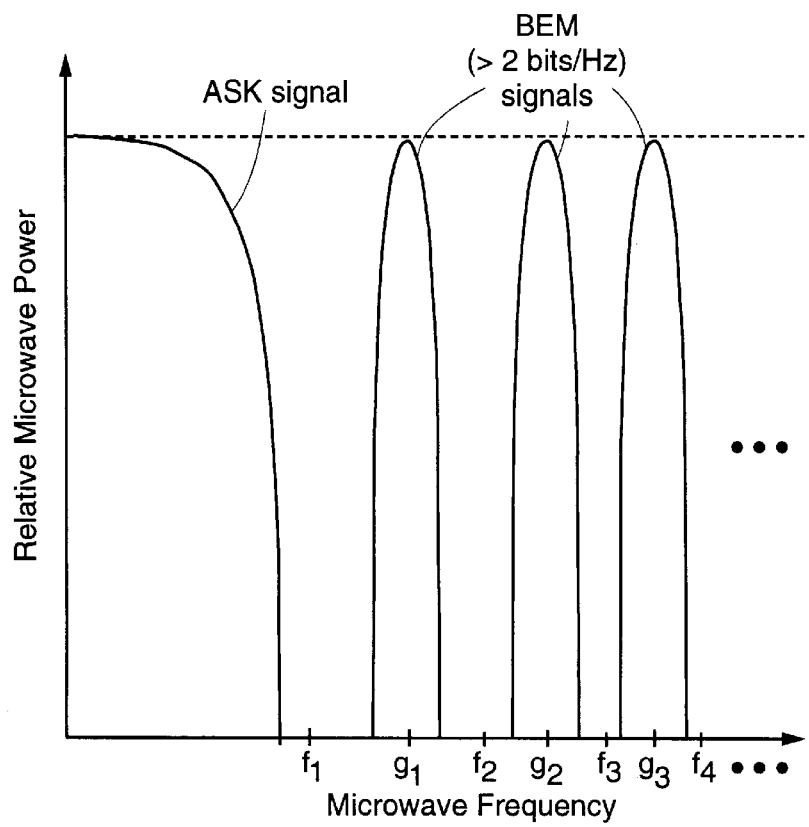

FIG. 2a illustrates an exemplary OOK microwave spectrum. FIG. 2b illustrates an exemplary composite microwave data spectrum in accordance with the principles of the present invention. To realize this spectrum, the modulated 8 GHz carrier are converted to a plurality of frequencies (g1, g2, ..., gn) using a plurality of frequency converters 15 (15-1, ..., 15-n) that are chosen such that the filters in the receiver (26-1, ..., 26-n) may cleanly separate the spectral data lobes. The signals are combined in a combiner 21 into a composite microwave spectrum (as shown in FIG. 2) and are then transmitted over the optical communication link 20, which may be either fiber 23b or free space 23a.

After reception at the electro-optic receiver 24, the recovered spectrum is separated into its individual data streams using a splitter 25 and a plurality of bandpass filters 26 (26-1, ..., 26-n). The originally transmitted data 11-1, ..., 1-n is then extracted from the data stream. The data modulated using the bandwidth efficient modulation is extracted using a plurality of frequency converters 27 and a plurality of demodulators 28. The plurality of frequency converters 27 convert the carriers from the plurality of frequencies (g1, g2, ..., gn) to produce the 8 GHz carriers 12, for example, and the plurality of demodulators 28 demodulate the bandwidth efficient modulation to generate the originally transmitted data 11-2, ..., 11-n carried by the higher carriers.

Given the above discussion, FIG. 3 is a flow diagram that illustrates an exemplary method 40 in accordance with the principles of the present invention that increases the information (data) carrying capacity of an optical communication link. The method 40 comprises the following steps.

Data streams for transmission are each encoded 41 onto multiple copies of a microwave carrier to produce multiple signals having a first carrier frequency. The carriers are converted 42 to appropriate frequencies such that the filters in a receiver can separate the data lobes of the transmitted composite spectrum. The frequency converted modulated carriers are then combined 43 to provide a composite (microwave) signal. This composite signal is transmitted 44 over an optical communication link. The composite signal is reproduced 45 at a receiving end of the optical communication link. The individual data streams are separated out 46 from the composite signal, and are converted 47 back to the original carrier frequency used in encoding step 41. The signals are then demodulated 48 to generate the originally transmitted data.

Thus, a method that increase the information carrying capacity of optical communication links has been disclosed. It is to be understood that the described embodiments are merely illustrative of some of the many specific embodiments which represent applications of the principles of the present invention. For instance, the modulation and demodulation does not have to occur at the same intermediate frequency for different carriers (8 GHz in the example). Clearly, numerous and other arrangements may be readily devised by those skilled in the art without departing from the scope of the invention.

What is claimed is:

1. A method for increasing the information carrying capacity of an optical communication link, comprising the steps of:

encoding data streams for transmission onto multiple copies of a carrier to produce multiple signals having an original carrier frequency;

converting the carriers to appropriate frequencies to provide frequency converted modulated carriers that are spaced so that associated data spectral lobes of the carriers are separated;

combining the frequency converted modulated carriers to provide a composite signal;

transmitting the composite signal over the optical communication link;

receiving the composite signal at a receiving end of the optical communication link;

separating out the individual data streams from the composite signal;

converting the individual data streams back to the original carrier frequency; and demodulating the data streams to generate the originally transmitted data.

2. The method recited in claim 1 wherein the step of encoding data streams for transmission uses M-ary amplitude shift keyed modulation.

3. The method recited in claim 1 wherein the step of encoding data streams for transmission uses M-ary phase shift keyed modulation.

4. The method recited in claim 1 wherein the step of encoding data streams for transmission uses M-ary quadrature amplitude modulation.

5. A system that increases the information carrying capacity of an optical communication link, comprising:

a plurality of modulators for encoding data streams for transmission onto multiple copies of a carrier to produce multiple signals having an original carrier frequency;

a plurality of frequency converters for converting the carriers to a plurality of frequencies that are respectively spaced such that data spectral lobes of the carriers are separated;

a combiner for combining the signals into a composite spectrum for transmission over the optical communication link;

separation circuitry for separating a received composite spectrum into individual data streams; and extraction circuitry for extracting the originally transmitted data from each data stream.

6. The system recited in claim 5 wherein the optical communication link comprises a free space beam.

7. The system recited in claim 5 wherein the optical communication link comprises an optical fiber.

8. The system recited in claim 5 wherein the optical communication link comprises one channel of a wavelength division multiplexed link.

9. The system recited in claim 5 wherein all but a first modulator encodes data for transmission using bandwidth efficient modulation comprising M-ary amplitude shift keyed modulation.

10. The system recited in claim 5 wherein all but a first modulator encodes data for transmission using bandwidth efficient modulation comprising M-ary phase shift keyed modulation.

11. The system recited in claim 5 wherein all but a first modulator encodes data for transmission using bandwidth efficient modulation comprising M-ary quadrature amplitude modulation.

12. The system recited in claim 7 wherein the separation circuitry comprises a splitter coupled to a plurality of bandpass filters.

13. The system recited in claim 7 wherein the extraction circuitry comprises a plurality of frequency converters and a plurality of demodulators.

* * * * *